June 10, 1969 C. VAN DER LELY 3,448,568
AGRICULTURAL VEHICLES
Filed Dec. 16, 1964 Sheet 1 of 5

INVENTOR.
CORNELIS VAN DER LELY
BY
Mason, Mason & Albright
Attorneys

INVENTOR.
CORNELIS VAN DER LELY

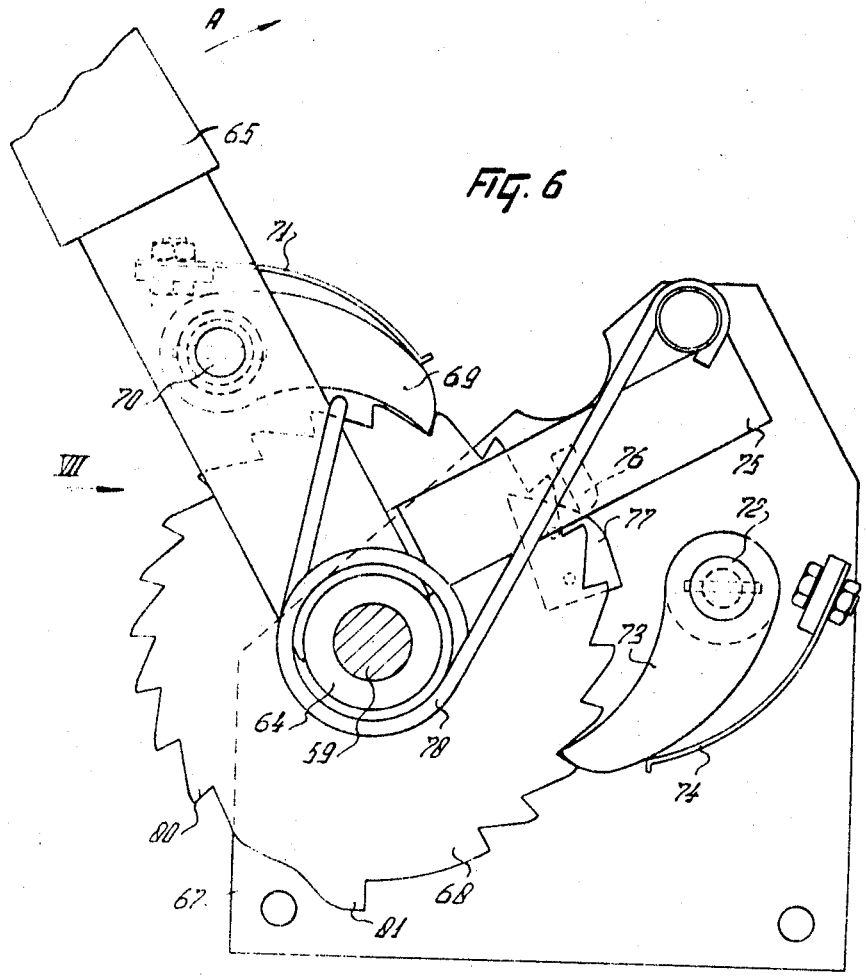

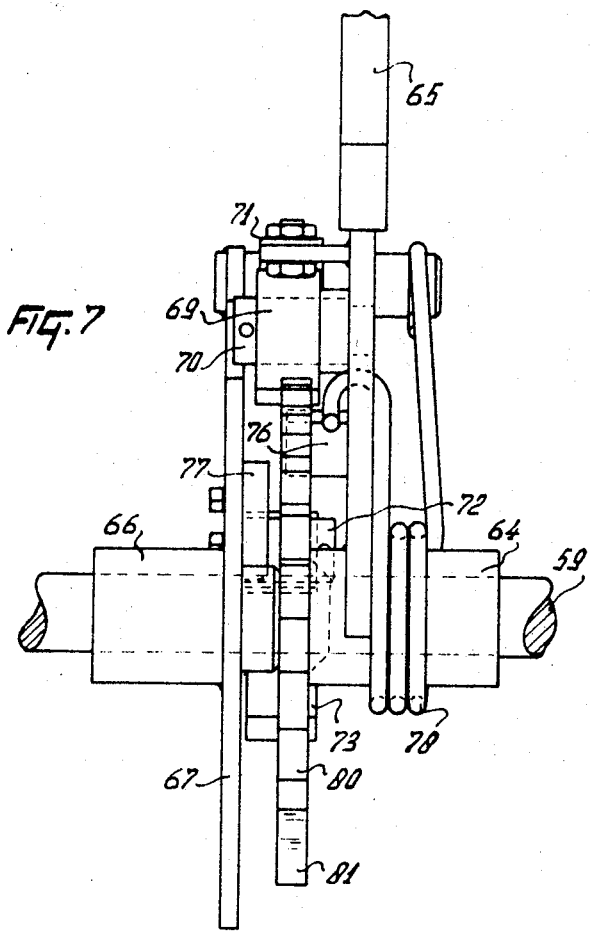

United States Patent Office 3,448,568
Patented June 10, 1969

3,448,568
AGRICULTURAL VEHICLES
Cornelis van der Lely, Zug, Switzerland, assignor to Texas Industries Inc., Willemstad, Curacao, Netherlands Antilles, a limited-liability company of the Netherlands Antilles
Filed Dec. 16, 1964, Ser. No. 418,821
Claims priority, application Netherlands, Jan. 2, 1964, 6400001, 6400002, 6400003
Int. Cl. A01d 87/04
U.S. Cl. 56—351                              25 Claims

ABSTRACT OF THE DISCLOSURE

An agricultural vehicle for loading and transporting cut crop having initial crop-guiding part followed by a tined pickup which conveys the cut crop into a feed channel of decreasing size; overhead pins forcing the cut crop into the attached receptacle by moving in a more or less cucumber-shaped path whereby the crop is forced into the receptacle space; there being a moving floor level with the axle of the vehicle supporting wheel selectively moving the crop to the rear away from the feed channel. The rear gate of the receptacle hinged from the top thereof and selectively releasable so as to give away to crop in the receptacle moved by the movable floor as desired.

The invention relates to an agricultural vehicle for loading, transporting and unloading, comprising a mechanism for picking up and loading crop lying on the ground, the crop being guided through a feeding channel into the loading space.

According to the invention the opening of the feeding channel, through which the crop is guided from the channel into the loading space, is located at a given distance above the loading floor and beneath the upper side of the loading space, while the opening of the channel is orientated at least substantially horizontally and the tines of the mechanism by which the crop is moved into the loading space move close to the opening. The crop can thus be moved effectively into the loading space of the vehicle.

The invention relates further to an agricultural vehicle for loading, transporting and unloading, comprising a frame, which is supported from at least two wheels located each on one side of the longitudinal axis of the vehicle and arranged on an axle, and comprising a mechanism by which, during the travel, the crop lying on the ground is picked up and loaded on the vehicle and which comprises an endless roller floor, one portion of which is adapted to move above the loading floor and a further portion of which is adapted to move underneath the loading floor.

According to the invention the frame comprises two beams extending in the longitudinal direction of the vehicle while the roller floor is arranged between said beams and the wheels so that the bottom side of the roller floor portion moving underneath the loading floor is located at least approximately on the same level as the axle on which the ground wheels are mounted and on which the bottom sides of said beams bear.

This permits of constructing a vehicle having a point of gravity lying on a low level.

For a better understanding of the invention and to show how the same may be readily carried into effect, reference is made by way of example to the accompanying drawing.

FIGURE 6 shows part of the lifting member of the pick-up mechanism for the crop.

FIGURE 7 is an elevation in the direction of the arrow VII in FIGURE 6.

Figure 1:
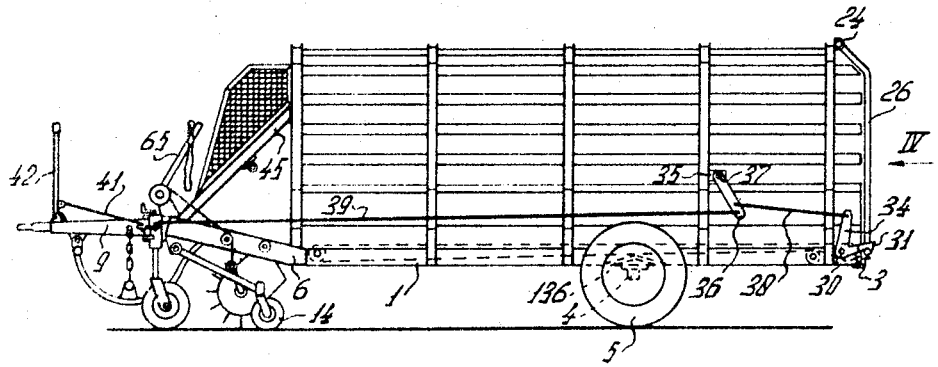
FIGURE 1 is a side elevation of an agricultural vehicle according to the invention.
Figure 2:
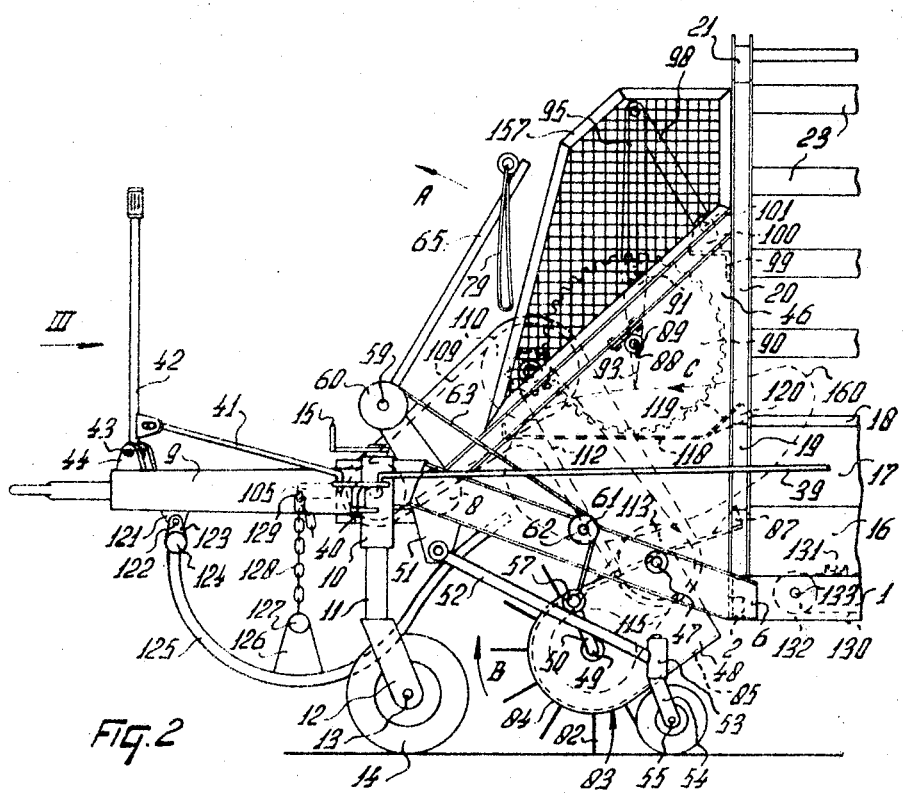
FIGURE 2 shows on an enlarged scale the front part of the vehicle of FIGURE 1 also in a side elevation.
Figure 3:
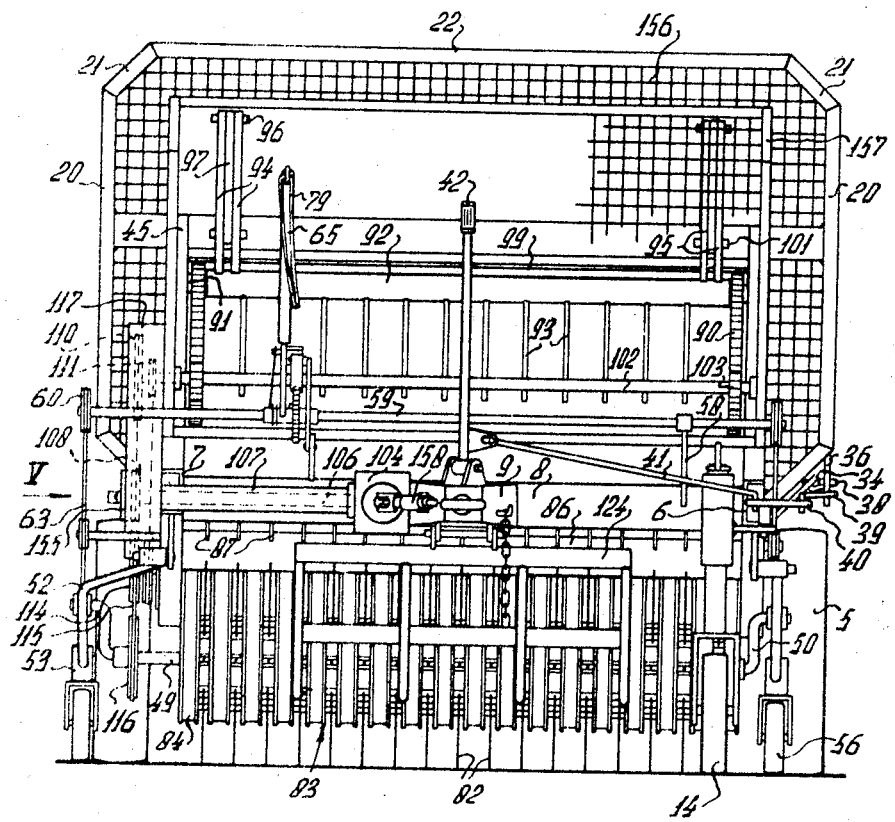
FIGURE 3 is an elevation in the direction of the arrow III in FIGURE 2.
Figure 4:
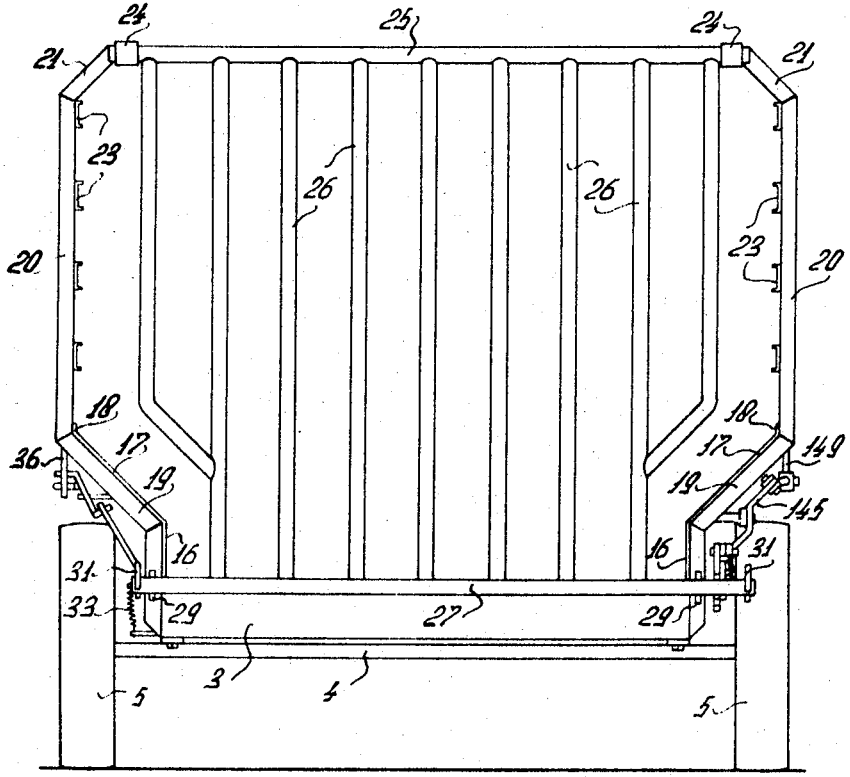
FIGURE 4 is a rear view of the agricultural vehicle shown in FIGURE 1.
Figure 5:
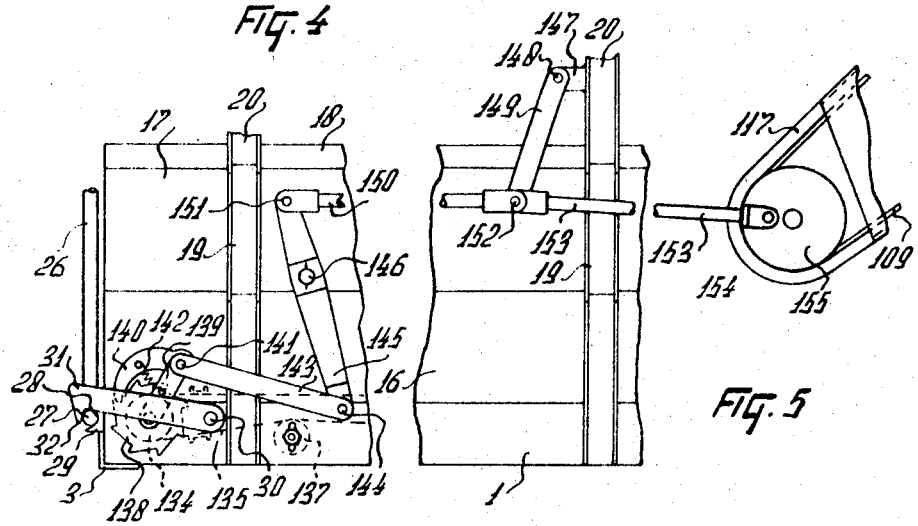
FIGURE 5 shows on an enlarged scale a side elevation of parts of the vehicle in the direction of the arrow V in FIGURE 3.

The frame of the agricultural vehicle comprises two parallel frame beams 1, extending in the longitudinal direction of the vehicle and formed by channel-section profiles. Both on the front side and on the rear side the two frame beams are connected with each other by frame beams 2 and 3, extending at right angles to the frame beams 1 and also formed by channel-section profiles. Approximately at the center of the frame beams 1 extending in the longitudinal direction a shaft 4 is fastened to them at right angles, ground wheels 5 being arranged each at one end of said shaft. To the ends of the frame beams 1 are secured frame beams 6 and 7, which extend obliquely to the front in upward direction. The free ends of the frame beams 6 and 7 are interconnected by a frame beam 8, extending parallel to the frame beam 2. At the center of the frame beam 8 a draw bar 9 is secured so as to project to the front, the device being connectable by means of said draw bar with a tractor or a similar vehicle. A support 10 is secured to the end of the frame beam 8 located near the frame beam 6 for holding a vertical shaft 11. A fork 12 is secured to the lower end of the shaft 11 for accommodating a horizontal shaft 13. A ground wheel 14 is freely rotatable around the shaft 13, the center line of which crosses the center line of the shaft 11 at right angles so that the ground wheel 14 is a caster ground wheel. By means of a crank 15 the ground wheel can be adjusted in known manner in a direction of height relatively to the frame.

The side walls of the vehicle comprise metal sheets 16, which extend upwardly from the frame beams 1 and which terminate at a given distance above the channel-section beams 1 in metal sheets 17, extending obliquely upwards towards the outer side of the vehicle. The sheets 17 are at an angle of about 60° to the horizontal. At their upper sides the sheets 17 are bent over so that the bent-over rims 18 extend parallel to a vertical plane.

The distance between the outer sides of the rims 18 is greater than the distance between the outer sides of the two ground wheels 5, so that on plan the two ground wheels 5 are located inside the outer sides of the side walls of the vehicle.

Beams 19, formed by channel-section profiles of metal sheets extend along the outer sides of the frame beams 1, the sheets 16 and the sheets 17. The beams 19 are integral with vertical metal beams 20, which have the same sectional area as the beams 19. On the upper sides of the beams 20 there are secured metal beams 21, which have the same profile as the beams 20 and which are at an angle of about 45° to the beam 20, while they are orientated towards the center of the vehicle. The beams 21 are interconnected by beams 22, extending, on plan, at right angles to the beam 1 and having the same profile as the beams 21.

The brackets formed by the beams 20, 21 and 22 are interconnected by beams 23, secured to the brackets and extending parallel to the beams 1 and being made from metal sheet; said beams also have the shape of the channel-section profile. The height of the parallel limbs of the beams 23 is approximately equal to one-fourth of the width of the web between the two limbs. By using these metal beams a light-weight, solid structure can be obtained.

Two bearings 24 are secured to the ends of the hindmost beam 22, which bearings accommodate the ends of a round frame beam 25, extending along the hindmost beam 22. Equidistant beams 26, formed by hollow tubing, are secured at their ends to the round frame beam 25. The ends of the two beams 26, lying on the outer side in a rear view, are bent over to the interior, so that they are parallel to the parts 17 of the side walls and are secured to the beams 26, located at the side of the outermost beam 26. In a side view the beams 26 extend away from the beam 25 obliquely to the rear and in downward direction, where they terminate in vertical portions. The beams 26 located between the two outermost beams 26 extend, viewed from behind, perpendicularly downwards and are secured at their bottom ends to a beam 27, extending parallel to the beam 25 and formed by a circular pipe. The rear wall of the vehicle formed by the beams 25, 26 and 27 is shown in the figures in the closed state. The ends of the beam 27 are then located in recesses 28 provided in vertical sheets 29, secured to the beam 3.

The rear ends of the two frame beams 1 accommodate a shaft 30, extending parallel to the frame beam 3. Arms 31 are secured to the two ends of the shaft 30, projecting beyond the beams 1, said arms being provided at their free ends with lugs 32. In the position shown in FIG. 1 the ends of the shaft 30 are enclosed between the sheets 29 and the lugs 32 so that the ends of the shaft 30 are held in the recesses 28 provided in the sheets 29. A spring 33, one end of which is secured to an arm 31 and the other end of which is connected with the frame of the vehicle, tends to hold the arms 31 in the position shown in the figures. One of the arms 31 has secured to it an upwardly extending arm 34. A support 35 is secured to the side wall of the vehicle an arm 36 being pivoted to said support by means of a horizontal stub shaft 37, extending at right angles to the longitudinal direction of the vehicle. To the lower end of the arm 36 is pivoted one end of a rod 38, which links the arm 36 to the arm 34, to which the other end of the rod 38 is pivoted. The free end of the arm 36 is furthermore hinged to the end of a coupling rod 39, which extends along the side of the vehicle to the front and is located, viewed from above, within the outer sides of the frame beams 20, so that the risk of damage for the coupling rod 39 is slight. The front end of the coupling rod 39 is slightly bent over towards the center of the vehicle and the front end of the rod 39 is hinged to a horizontal triangular plate 40. The triangular plate 40 is hinged by means of a vertical stub shaft to the frame. The end of a coupling rod 41 is pivoted to the plate 40. The coupling rod 41 is, on plan, at an angle of 45° to the longitudinal direction of the vehicle and the end of the coupling rod 41 remote from the plate 40 is hinged to a lever 42. The lever 42 is pivoted by means of a horizontal shaft 43 to two supports 44, secured to the draw bar. The shaft 43 extends, on plan, at least approximately at right angles to the coupling rod 41.

Between the foremost ends of the frame beams 6 and 7 and the front side of the side walls located near the frame beams 6 and 7 there are arranged frame beams 45 extending obliquely upwards away from the frame beams 6 and 7. The space between the frame beams 6 and 7 and the frame beams 45 is closed by means of vertical plates 46. Bearings secured to the frame beams 6 and 7 accommodate a shaft 47, extending parallel to the frame beam 2. Supporting members 48 are freely rotatable about the shaft 47. Between said supporting members 48 there is arranged a shaft 49, which extends parallel to the shaft 47 and which is journalled in bearings secured to the supporting members 48. Arms 50 are freely rotatable on the ends of the shaft 49 projecting from the supports 48. The ends of the frame beam 8 are provided with ears 51, extending in downward direction and having hinged to them the ends of beams 52, extending obliquely rearwards and downwards. Sleeves 53 are fastened to the ends of the beams 52 remote from the ears 51 for accommodating shafts extending in upward direction. Forks 54 are secured to said shafts for accommodating horizontal shafts 55. Caster wheels 56 are freely rotatable about the shafts 55. The ends of the arms 50 remote from the shaft 49 are hinged to the beams 52 by means of stub shafts 57, extending parallel to the shaft 49.

The frame beam 8 is furthermore provided with supports 58, extending in upward direction and accommodating a horizontal shaft 59, extending at right angles to the longitudinal direction of the vehicle. Pulleys 60 are secured to the ends of the shaft and pulleys 62 are arranged on the frame beams 6 and 7 with the aid of stub shafts 61, extending parallel to the shaft 59. The end of a rope 63 is secured to each of the arms 50. The other end of each rope 63 is secured to a pulley 60.

A sleeve 64 is adapted to rotate about the shaft 59 and to serve as a hold for a lever 65 (FIGS 6 and 7). At the side of the sleeve 64 a sleeve 66 is arranged around the shaft 59 and is rigidly secured to the frame by means of a plate 67. A pawl wheel 68 is secured to the shaft 59 and the lever 65 is provided with a pawl 69, by means of a stub shaft 70, extending parallel to the shaft 59. The pawl 69 is urged against the pawl wheel by means of a leaf spring 71. With the aid of a stub shaft 72 extending parallel to the shaft 59, a pawl 73 is coupled with the plate 67, said pawl also being urged against the periphery of the pawl wheel 68 by means of a leaf spring 74. The lever 65 has furthermore secured to it an arm 75, on which a lug 76 is arranged. A lug 77 is secured to the plate 67. A spring 78 tends to hold the lever in the position shown in the figure.

A rope 79 is secured to the end of the lever 65.

When, in operation, the vehicle is hitched to a tractor or a similar prime mover, the end of the rope 79 is located within reach of the driver of the vehicle. The driver of the tractor can pull the rope 79 from his seat on the tractor, so that the lever turns in the direction of the arrow A. The shaft 59 is thus turned and the ropes 63 will be wound around the pulleys 60 so that the stub shafts 57 are pulled upwards and the ground wheels 56 are set free of the ground. When the pawl 69 engages the toothing 80, the shaft 59 can no longer turn in the direction of the arrow A, since part of the circumference of the pawl wheel is not provided with teeth. In order to lower the ground wheels 56 with the parts coupled herewith, the lever must be turned in the direction of the arrow A to an extent such that the lug 76 comes into contact with the pawl 73, which is thus urged out of the toothing of the pawl wheel. At the same time the pawl 69 is urged out of the toothing of the pawl wheel by means of the lug 77. The shaft 59 is then capable of turning in a direction opposite the arrow A until the elevated lug 81 again comes into contact with a pawl.

The shaft 49 forms part of a drum, journalled in the supporting members and provided with resilient tines 82. Between the two supporting members 48 a screening member 83 surrounds the drum; its section is more or less U-shaped. The curved portion 84 of the member 83 is located near the front side of the drum and constitutes the connection between parts 85 and 86, extending obliquely upwards and rearwards. The curved part 84 and part of the portions 85 and 86 are formed by beams of channel-section profile, the limbs of which are facing the crop and having their ends secured to plates which form part of the portions 85 and 86. The tines 82 move, in operation, between the channel-section beams. The part of the portion 86 joining the curved part 84 is at an angle of about 25° to the horizontal in the position of the drum in operation, shown in the figures. At a given distance from the curved part 84 the hindmost part of the portion 85 is slightly bent over in downward direction, so that this part is at an angle of about 20° to the horizontal. Near the end of the part 86 there are provided triangular extensions 87, which are parallel to a vertical plane going through the longitudinal axis of the vehicle.

The extensions 87 are approximately shaped in the form of a right-angled triangle, one of the sides being secured to the part 86, whereas the hypotenuse extends from the plate obliquely in upward direction and to the rear.

At the side of the pick-up member formed by the drum there is arranged a feeding device. The feeding device comprises stub shafts 88, extending parallel to the shaft 47 and journalled in bearings 89, secured to the frame beams 45. Toothed wheels 90 are secured to the stub shafts 88 and are linked to each other by a shaft 91, extending parallel to the stub shafts 88, a pipe 92 being freely rotatable about said shaft. A plurality of arms or tines 93, extending in downward direction is secured to the pipe 92, to each end of which there are secured two ascending arms 94 and 95 respectively. At the ends of the arms remote from said pipe there are pivotally arranged ends of coupling rods 97 and 98 located between said arms by means of pins 96, extending parallel to said pipe. On the front side of the vehicle between the upper ends of the frame beams 45, there is provided a frame beam 99, to which ascending supports 100 are secured. The ends of the coupling rods 97 and 98 remote from the arms are pivoted to the supports 100 with the aid of pins 101, parallel to the pins 96.

Bearings secured to the frame beams 45 accommodate a shaft 102, extending parallel to the shaft 47 and having secured to it two toothed wheels 103, the teeth of which engage the teeth of the toothed wheels 90.

A gear box 104 is secured to the frame beam 8 at the side of the draw bar 9. The end of a shaft 105 extending parallel to the longitudinal axis of the vehicle, projects from the front side of said gear box. The shaft 105 is coupled via a gear wheel transmission housed in the gear box 104 with a shaft 106, which is screened over at least the major part of its length by a pipe 107, extending parallel to the frame beam 8. To one end of the shaft 106 there is fastened a pulley 108, which is linked by means of a rope 109 to a pulley 110, fastened to one end of the shaft 102. A pulley 111 is furthermore secured to the shaft 102 and is linked by means of a rope 112 to a rotatable pulley 113 on the shaft 47. The pulley 113 is integral with a second pulley 114, which is connected by means of a rope 115 with a pulley 116, secured to the shaft 49 of the drum. The various rope transmissions are screened by screening boxes 117.

At a given distance above the portion 86 the plates 46 have arranged between them a plate 118, which is horizontal over the major part of its length. Only the end 119 of the plate 118 is bent over upwardly through an angle of about 45° and triangular extensions 120 are secured to said ascending part, said extensions being parallel to a vertical plane going through the longitudinal axis of the vehicle. One of the sides of the triangle engages the plate and to the rear the height of the triangle increases gradually. The plate 118 is provided with elongated holes, through which the arms 93 are adapted to move. It is in general advantageous to bend over the rims of the plate portions between the elongated holes in downward direction, so that these parts have a channel section. The structure thus becomes more rigid and the crop can be more easily scraped off the arms 93.

On the lower side of the draw bar 9 there are secured two ears 121, which accommodate a horizontal shaft 122, extending at right angles to the longitudinal direction of the vehicle. Two ears 123 are freely rotatable about the shaft 122 and have secured to them a pipe 124, extending parallel to the shaft 122. Four pipes 125, extending to the rear are secured to the pipe 124. In a side view the pipes extend over part of their lengths away from the pipe 124 in downward direction and terminate at a given distance behind and beneath the pipe 124 in an ascending portion, while the free ends are slightly bent downwards. In a plan view the free ends of the bars are located near the front side of the pick-up member and in a side view the ends of the bars extend approximately parallel to the circle described by the foot points of the tines 82 of the drum forming part of the pick-up member. At the lowermost points the bars 125 have secured to them ascending plates 126, the upper ends of which are interconnected by a pipe 127, to which the end of a chain 128 is fastened. A support 129 is secured to the draw bar and one of the links of the chain 128 can be hooked onto said support so that the guide member formed by the bars 125 can be adjusted to different positions above the ground.

The vehicle furthermore comprises a roller floor, which comprises endless chains 130, to which are secured fillets 131, formed by channel-section beams and extending transversely of the longitudinal direction of the vehicle. The endless chains are supported on sprocket wheels 132, which are secured to a shaft 133, journalled on the front side of the vehicle between the frame beams 1 and on sprocket wheels 134, which are secured to a shaft 135, journalled on the rear side of the vehicle between the frame beams 1. The arrangement of the two shafts 133 and 135 is such that the part of the roller floor moving beneath the loading floor of the vehicle is located between the two frame beams, the bottom side of the roller floor lying slightly higher than the bottom side of the frame beams. The roller floor is satisfactorily protected between the frame beams and also the frame beam 3 on the rear contributes to a satisfactory screening of the roller floor, since the horizontal limb of the channel-section frame beam 3 extends even beneath the two frame beams 1. Above the shaft 4 there is arranged a guide member 136, which prevents the fillets 131 from hooking behind the shaft 4.

Near the shaft 135 guide rollers 137 for the chains are provided for guiding the chains 130 in a manner such that they surround the sprockets 134 through a large circumferential angle.

At one end of the shaft 135, to which the sprockets 134 are secured, there is provided a pawl wheel 138. An arm 139 is freely rotatable about said shaft and at one end of the arm 139 there is pivotally arranged a pawl 140, cooperating with the pawl wheel 138, by means of a stub shaft 141. A spring 142, arranged between the pawl 140 and the arm 139, draws the pawl against the pawl wheel. With the aid of the stub shaft 141 a coupling rod 143 is hinged to the arm 139. The end of the rod 143 remote from the arm 139 is pivoted by means of a pin 144 to a lever 145, which is adapted to turn about a shaft 146, secured to the frame. One of the beams 20 is provided with an ear 147, to which an arm 149 is hinged by means of a pin 148. The lever 145 is connected with the arm 149 by means of a coupling rod 150, which is coupled with the lever 145 by means of a pin 151 and with the arm 149 with the aid of a pin 152.

By means of the pin 152 one end of a coupling rod 153 is also pivoted to the arm 149. The other end of the coupling rod 153 is connected with the aid of a stub shaft 154, extending parallel to the shaft 106, with a disc 155, arranged on the shaft 106.

From the figures it will furthermore be apparent that the front wall 156 of the vehicle is formed by a network of metal wire. The feeding device is surrounded by a screening hood 157, bearing on the frame beams 45 the walls of which hood are also formed by a network of metal wire. The network is preferably made from conventional, commercially available gauze.

The vehicle described above may be hitched by means of the draw bar to a tractor or a similar vehicle. The shaft 106 may be coupled with the aid of an intermediate shaft 158 with the power take-off shaft of the tractor. If the intermediate shaft is not coupled with the power take-off shaft, its free end is slipped onto a support 159, secured to the draw bar 9.

During the travel the pick-up member comprising the drum and the feeding device comprising the arms or tines 93 can be driven by the power take-off shaft of the tractor. Through the various rope transmissions the drum provided with tines 82 can be caused to rotate, as well as the two toothed wheels 90, supporting the shaft 91. The roller floor can be displaced intermittently by means of the coupling rods 150 and 153 and the pawl- and pawl-wheel mechanism 138 to 140. The roller floor and the pick-up and pushing mechanism will preferably be driven independently of each other.

During the movement of the vehicle the crop, which may be deposited in swaths, is distributed fairly uniformly by the guide member in front of the drum. The crop is caught by the tines 82 of the drum, which rotates in the direction of the arrow B and brought within reach of the arms 93, which move in the direction of the arrow C along the path 160. During the upward swing of the crop by means of the tines 82 of the drum the crop is aslo guided by the bars 125. By means of the chain 128 the position of the bars can be varied in accordance with the quantity of crop to be worked. Since the guide member formed by the bars 125 can be readily disengaged, it may be removed, if desired. The channel-section profiles, between which the tines are adapted to move, scrape the crop from the tines so that it is not drawn across the gaps between the profiles by the tines.

By means of the arms 93 the crop is pushed into the loading space through the feeding channel, the lower wall of which is formed by the portion 86 of the screening member 83, while the upper wall is formed by the plate 118.

Viewed in the direction of movement of the crop in the feeding channel, the height of the feeding channel gradually decreases, which is conducive to the displacement of the crop. The crop is brought into the vehicle at a given height above the loading floor. The lower side of the opening is located at a height above the loading floor which is approximately equal to one tenth of the height of the loading space, whereas the upper side of the opening is located at a height above the loading floor which is approximately equal to three tenths of the height of the loading space. The opening, which is provided in the front wall of the trailer, is orientated horizontally, which means that the edges of the opening are located at different heights above the horizontal plane. In this embodiment the upper edge is located at least substantially perpendicularly above the lower edge. The extensions 87 and 120, provided near the opening, prevent the crop once pushed into the loading space from falling back into the feeding channel.

With the disposition and structure described above for the feeding channel the crop located in the loading space is prevented from exerting a high pressure on the crop located in the feeding channel, which might impede the displacement of the crop. When a given quantity of crop is located in the loading space, the roller floor may be actuated for displacement of the crop further to the rear in the loading space. In this manner the loading space can be completely filled during the travel of the vehicle.

Since the front wall of the vehicle and the walls of the screening hood surrounding the pushing member are formed by networks of metal wires, the driver of the tractor pulling the trailer has a good survey of the operation of the crop-displacing members. Owing to the pivotal suspension of the supporting members 48, in which the drum provided with the tines 82 is arranged, and to that of the ground wheels 56, the tines of the drum can satisfactorily match the unevenness of the ground, so that the crop lying on the ground will be satisfactorily picked up.

Since the ground wheel 14, viewed in the longitudinal direction of the vehicle, is located near the side of the vehicle, it will not hinder the supply of crop to the pick-up member, even if it is lifted from the ground only over a small distance.

When the loading space of the vehicle is filled, the pick-up member may be lifted from the ground with the aid of the lever 65. Owing to the suspension provided for the pick-up member this member can be lifted over a fairly large distance. It is furthermore advantageous that the drives of the various parts are located substantially completely on one side of the vehicle.

When the vehicle has to be unloaded, the driver of the vehicle can pull the lever 42 from his seat, so that the arms 31 are turned in anti-clockwise direction. The rear wall of the vehicle can then turn freely about the center lines of the bearings 24. By actuating the roller floor, the crop is pushed out of the vehicle on the rear side. Since the parts 16 and 17 of the side walls are formed by flat plates, these parts will not retain the crop, so that the pressure of the crop on the roller floor is invariably sufficient to eliminate the risk of the crop being left behind by the roller floor. Since the roller floor is located at least substantially at the level of the axle of the vehicle, a low construction is obtained, so that high stability is ensured. Since, moreover, the loading space is built beyond the wheels, the space has a high capacity. The width of the roller floor is smaller than in the case in which the loading floor is constructed above the wheels. This permits of providing a more rugged structure of the roller floor, whereas the delivery of material in the loading space does not give rise to difficulties.

Having thus described my invention, what I claim as new and desire to secure by Letters Patent of the United States is:

1. An agricultural vehicle for the loading and transporting of crop, including green crop and hay, which comprises
   a frame,
   a receptacle adapted for carrying crop attached to said frame,
   a crop pickup apparatus disposed in the forward part of said vehicle and interconnected to said frame,
   a conveyor device carried by said frame adjacent said pickup apparatus,
   a driving member included in said conveyor device adapted to rotate about a substantially horizontal axis of rotation extending across the forward part of the vehicle,
   a plurality of tines included in said conveyor device eccentrically coupled to said driving member and adapted to rotate therewith,
   connecting means interconnecting said frame and said tines,
   a feeding chamber interconnected to said frame disposed between said pickup apparatus and said receptacle, a discharge opening from said feeding chamber opening into said receptacle substantially below the top of said receptacle, said receptacle being substantially large relative to said chamber and said discharge opening,
   endless means in the lower portion of said receptacle comprising the floor thereof adapted to move crop from the forward to the after portion of said receptacle,
   said discharge opening situated at the forward end of said endless means,
   an upper wall included in said feeding chamber, said upper wall being substantially horizontal from its forward portion over the major part of its length with the after portion slanting upwardly, said tines moving through said feeding chamber whereby crop is moved into said receptacle upwardly and to the rear by said tines, said feeding chamber being oriented substantially horizontally whereby crop is moved generally horizontally through said feeding chamber and said crop remains in an unpressed condition.

2. A vehicle as claimed in claim 1, wherein the upper leading edge and the lower leading edge of said feeding chamber are located in a relationship of substantial perpendicularity one above the other.

3. A vehicle as claimed in claim 1, wherein the interior height of said feeding channel near the point where the crop is received therein is greater than its interior height near the point where the crop is discharged therefrom.

4. An agricultural vehicle in accordance with claim 1, wherein the after portion of said upper wall of the feeding chamber slants upward about forty-five degrees from the horizontal.

5. An agricultural vehicle in accordance with claim 1, wherein said feeding chamber includes a lower wall which extends oblique upwards from the forward part of said feeding chamber to said discharge opening.

6. A vehicle as claimed in claim 5, wherein the foremost part of the lower wall of the feeding channel, viewed in the direction of movement of the crop through said channel, is at an angle of about 25° to the horizontal.

7. A vehicle as claimed in claim 5, wherein the hindmost part of the lower wall of the feeding channel is at an angle of about 20° to the horizontal.

8. A vehicle as claimed in claim 7, wherein on the lower wall of the feeding channel, near the discharge opening, there are provided extensions parallel to a vertical plane.

9. A vehicle as claimed in claim 8, wherein on the upper wall, in the proximity of the discharge opening, there are provided extensions parallel to a plane.

10. A vehicle as claimed in claim 9, wherein said extensions are formed by triangular plates the height of which increases gradually towards the opening.

11. A vehicle as claimed in claim 1, wherein the pickup mechanism comprises a tined rotatable drum and screening member surrounds said drum, a part of the screening member constituting the bottom of the feeding channel and elongated slots being provided in the screening member for receiving the rotating tines.

12. A vehicle as claimed in claim 11, wherein the portion of the screening member located between the elongated slots is formed by channel beams, the limbs of the beams oriented towards the crop extending parallel to the direction of movement of the tines.

13. A vehicle as claimed in claim 1, wherein the discharge opening of the feeding channel is arranged in the front wall of the vehicle.

14. A vehicle as claimed in claim 13, wherein there is provided a guide member for the crop cooperating with the pickup mechanism so that the crop moves between the guide member and the pickup mechanism, said guide member comprising deflecting means for urging the crop in an upward direction relatively to the pickup mechanism.

15. An agricultural vehicle for loading and transporting crop comprising a frame, a feeding channel carried by said frame, a loading floor mounted on said frame, a pickup mechanism supported by said frame near one end of the floor for picking up crop lying on the ground and urging the crop to said feeding channel to discharge same above said floor, a crop receptacle on said frame and said feeding channel being in communication with said receptacle substantially below the top of said receptacle, said feeding channel being oriented substantially horizontally whereby crop is moved generally horizontally through said feeding channel and said crop remains in an unpressed condition, said pickup mechanism including rotating tine means for urging said crop to said channel, guide means located forward of said mechanism for deflecting said crop upwardly into said channel said guide means including a guide part curved above and to the rear relative to said tine means.

16. A vehicle as claimed in claim 15, wherein over part of its length the guide means extends at least substantially parallel to the path described by the rotating tine means.

17. A vehicle as claimed in claim 15, wherein the pickup mechanism comprises a tined drum which rotates about a substantially horizontal axis.

18. A vehicle as claimed in claim 15, wherein a drawbar is included at the forward end of the vehicle and the guide means is located in front of the pickup mechanism and is pivoted to the drawbar.

19. A vehicle as claimed in claim 18, wherein the position of the guide means is selectively variable.

20. A vehicle as claimed in claim 18, wherein the guide means is coupled with the frame with the aid of a first pivotal shaft extending parallel to the axis of rotation of the pickup mechanism, said first pivotal shaft being located in front of the pickup mechanism.

21. A vehicle as claimed in claim 20, wherein the pickup mechanism is hinged to the frame by a second pivotal shaft.

22. An agricultural vehicle for the loading and transporting of crop, including green crop and hay, which comprises
a frame,
a receptacle adapted for carrying crop attached to said frame,
a crop pickup apparatus disposed in the forward part of said vehicle and interconnected to said frame,
a tined conveyor device carried by said frame adjacent said pickup apparatus
a feeding chamber interconnected to said frame disposed between said pickup apparatus and said receptacle, said feeding chamber opening into said receptacle substantially below the top of said receptacle, said feeding chamber being oriented substantially horizontally whereby crop is moved generally horizontally through said feeding chamber and said crop remains in an unpressed condition,
said tined conveyor device operatively received in said feeding chamber whereby crop entering said feeding chamber is conveyed by said tined conveyor device into said receptacle,
guide means mounted on said frame in front of said feeding chamber including a portion extending above said pickup device,
said guide means vertically movable relative to said tined conveyor device and said pickup device,
said guide means cooperating with said pickup apparatus whereby crop picked up by said pickup apparatus is guided to said tined conveyor device in said feeding chamber.

23. An agricultural vehicle for the loading and transporting of crop, including green crop and hay, which comprises
a frame,
a receptacle adapted for carrying crop attached to said frame,
a crop pickup apparatus disposed in the forward part of said vehicle and interconnected to said frame,
a conveyor device carried by said frame adjacent said pickup apparatus,
a driving member included in said conveyor device adapted to rotate about a substantially horizontal axis of rotation extending across the forward part of the vehicle,
a plurality of tines eccentrically coupled to said driving member and adapted to rotate therewith,
a feeding chamber interconnected to said frame disposed between said pickup apparatus and said receptacle, the upper side of said feeding chamber being substantially horizontal over most of its length and the lower side sloped upwardly from front to rear, said feeding chamber terminating in a discharge opening into said receptacle, substantially below the top of said receptacle, said feeding chamber being oriented substantially horizontally whereby crop is moved generally horizontally through said feeding chamber and said crop remains in an unpressed condition, said receptacle being substantially larger relative to said chamber and said discharge opening, the tines of said conveyor device operatively received in said feeding chamber, connecting means interconnecting said frame and said tines whereby said tines rotate to the rear through said feeding chamber and into said receptacle through said discharge opening, the path of said tines through said feeding chamber being approximately parallel to the upper side of said feeding chamber near the entrance thereof and approximately parallel to the lower side of said feeding chamber near the discharge opening thereof.

24. An agricultural vehicle for loading and transporting crop comprising a frame, a feeding chamber carried by said frame, a loading floor mounted on said frame, a pickup mechanism supported by said frame near one end of the floor for picking up crop lying on the ground and urging the crop to said feeding channel to discharge same above said floor, said pickup mechanism including rotating tine means for urging said crop to said channel, guide means located forward of said mechanism for deflecting said crop upwardly into said channel, said guide means including a guide part curved above and to the rear relative to said tine means, a draw bar at the forward end of the vehicle located in front of said pickup mechanism, said guide means being pivoted to said draw bar to be adjustably positionable, a first pivotal shaft coupling said guide means with said frame, said shaft located in front of said pickup mechanism to extend substantially parallel to the axis of rotation thereof, said pickup mechanism being hinged to said frame by a second pivotal shaft, ground wheels supporting said pickup mechanism, said wheels being coupled to said frame with arms to be rotatable about an axis extending substantially parallel to said second pivotal shaft, the arms of said pickup mechanism being coupled to each other by coupling members which are freely turnable with respect to said pickup mechanism about axes extending substantially parallel to the second pivotal shaft.

25. A vehicle as claimed in claim 24, wherein there is provided a lifting member by means of which the arms supporting the ground wheels and the pickup mechanism coupled herewith can be lifted.

References Cited

UNITED STATES PATENTS

| 1,416,972 | 5/1922 | Pagel | 56—347 |
| 1,914,281 | 6/1933 | Nicolay | 214—500 |
| 2,763,119 | 9/1956 | Helfeld | 56—344 |
| 2,839,885 | 6/1958 | Eischens | 56—364 |
| 2,845,169 | 8/1958 | Hüttz et al. | 56—344 |
| 3,233,765 | 2/1966 | Barnes | 214—500 |
| 745,862 | 12/1903 | Kerr | 100—187 X |
| 2,488,738 | 11/1949 | Pool | 56—364 |
| 2,729,047 | 1/1956 | Cheatum | 56—344 |
| 2,796,722 | 6/1957 | Hanford et al. | 56—364 |
| 2,839,981 | 6/1958 | Harstick et al. | 56—341 X |
| 2,872,772 | 3/1959 | Nolt | 56—364 |
| 3,098,340 | 7/1963 | Harrington et al. | 56—345 |
| 3,252,277 | 5/1966 | Weichel | 56—23 X |
| 3,267,655 | 8/1966 | Weichel | 56—364 |
| 3,331,199 | 7/1967 | Dechentreiter | 56—364 |

ABRAHAM G. STONE, *Primary Examiner.*

P. A. RAZZANO, *Assistant Examiner.*

U.S. Cl. X.R.

56—364